(12) United States Patent
Stephens et al.

(10) Patent No.: US 11,422,932 B2
(45) Date of Patent: Aug. 23, 2022

(54) INTEGRATED REFERENCE AND SECONDARY MARKING

(71) Applicant: Microsoft Technology Licensing, LLC, Redmond, WA (US)

(72) Inventors: Maoni Zhang Stephens, Kirkland, WA (US); Patrick Henri Dussud, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 316 days.

(21) Appl. No.: 16/724,143

(22) Filed: Dec. 20, 2019

(65) Prior Publication Data
US 2021/0191859 A1 Jun. 24, 2021

(51) Int. Cl.
| | | |
|---|---|---|
| *G06F 12/02* | (2006.01) | |
| *G06F 9/32* | (2018.01) | |
| *G06F 11/30* | (2006.01) | |
| *G06F 12/1018* | (2016.01) | |

(52) U.S. Cl.
CPC .......... *G06F 12/0261* (2013.01); *G06F 9/321* (2013.01); *G06F 11/3037* (2013.01); *G06F 12/0246* (2013.01); *G06F 12/0269* (2013.01); *G06F 12/1018* (2013.01)

(58) Field of Classification Search
None
See application file for complete search history.

(56) References Cited

U.S. PATENT DOCUMENTS

| | | | |
|---|---|---|---|
| 6,047,295 A | 4/2000 | Endicott et al. | |
| 7,577,657 B2 | 8/2009 | Earhart | |
| 7,716,192 B2 | 5/2010 | Petrank et al. | |
| 8,566,368 B2 | 10/2013 | Massarenti | |
| 8,578,380 B1 | 11/2013 | Adams et al. | |
| 8,825,719 B2 | 9/2014 | Steensgaard et al. | |

(Continued)

FOREIGN PATENT DOCUMENTS

WO 2020005597 A1 1/2020

OTHER PUBLICATIONS

"International Search Report and Written Opinion Issued in PCT Application No. PCT/US20/060813", dated Mar. 2, 2021, 11 Pages.

(Continued)

*Primary Examiner* — Yaima Rigol
(74) *Attorney, Agent, or Firm* — Ogilvie Law Firm

(57) ABSTRACT

Managing secondary objects efficiently increases garbage collection concurrency and reduces object storage requirements. Aliveness marking of secondary objects is integrated with aliveness marking of referenced objects. Allocation of reference-sized secondary object identifier fields in objects which are not primary objects is avoided; a dedicated bit specifies primary objects, together with an object relationship table. A primary object is one with at least one secondary object which is deemed alive by garbage collection if the primary object is alive, without being a referenced object of the primary object. Any referenced objects of the alive primary object will also still be deemed alive. Code paths for marking referenced objects can be shared to allow more efficient secondary object marking. Primary-secondary object relationships may be represented in dependent handles, and may be specified in a hash table or other data structure.

20 Claims, 5 Drawing Sheets

(56) References Cited

U.S. PATENT DOCUMENTS

| | | | |
|---|---|---|---|
| 9,489,406 | B1 | 11/2016 | Shapiro et al. |
| 9,519,668 | B2 | 12/2016 | Kaldewey et al. |
| 10,459,771 | B2 | 10/2019 | Tsirkin |
| 2002/0161894 | A1* | 10/2002 | Tapperson .............. G06F 9/548 709/227 |
| 2003/0069905 | A1 | 4/2003 | Dussud |
| 2003/0174572 | A1 | 9/2003 | Moir et al. |
| 2005/0033781 | A1 | 2/2005 | Dussud |
| 2005/0044057 | A1 | 2/2005 | Bluvshteyn et al. |
| 2005/0160421 | A1 | 7/2005 | Bluvshteyn et al. |
| 2005/0235120 | A1 | 10/2005 | Dussud |
| 2006/0020766 | A1 | 1/2006 | Dussud |
| 2006/0085460 | A1 | 4/2006 | Peschel-Gallee et al. |
| 2006/0085494 | A1 | 4/2006 | Dussud et al. |
| 2006/0156152 | A1 | 7/2006 | Trowbridge et al. |
| 2006/0230387 | A1 | 10/2006 | Prakriya et al. |
| 2007/0011658 | A1 | 1/2007 | Stephens |
| 2007/0022268 | A1 | 1/2007 | Stephens |
| 2007/0094651 | A1 | 4/2007 | Stephens et al. |
| 2007/0094671 | A1 | 4/2007 | Stephens et al. |
| 2007/0100919 | A1* | 5/2007 | Lee .................... G06F 12/0276 |
| 2007/0156967 | A1* | 7/2007 | Bond .................. G06F 12/0862 711/137 |
| 2008/0172431 | A1 | 7/2008 | Stephens et al. |
| 2008/0281885 | A1 | 11/2008 | Dussud |
| 2009/0172305 | A1 | 7/2009 | Shpeisman et al. |
| 2009/0222802 | A1 | 9/2009 | Dussud et al. |
| 2009/0254596 | A1 | 10/2009 | Dussud et al. |
| 2009/0259702 | A1 | 10/2009 | Stephens et al. |
| 2009/0265402 | A1 | 10/2009 | Dussud et al. |
| 2009/0292705 | A1 | 11/2009 | Mckenney et al. |
| 2009/0300085 | A1 | 12/2009 | Stephens et al. |
| 2010/0070957 | A1 | 3/2010 | Mariani et al. |
| 2010/0318584 | A1 | 12/2010 | Krishnaprasad et al. |
| 2010/0333107 | A1 | 12/2010 | Omara et al. |
| 2011/0173634 | A1 | 7/2011 | Kottapalli et al. |
| 2011/0202748 | A1 | 8/2011 | Jacobi et al. |
| 2013/0091186 | A1 | 4/2013 | Stephens et al. |
| 2014/0032841 | A1* | 1/2014 | Ahmad ............... G06F 12/0246 711/115 |
| 2015/0227414 | A1 | 8/2015 | Varma |
| 2016/0239413 | A1 | 8/2016 | Stephens et al. |
| 2016/0306739 | A1 | 10/2016 | Stephens et al. |
| 2017/0116247 | A1 | 4/2017 | Jonsson et al. |
| 2017/0228223 | A1 | 8/2017 | Bosworth et al. |
| 2017/0351490 | A1 | 12/2017 | Wrighton et al. |
| 2018/0074865 | A1 | 3/2018 | Rungta et al. |
| 2018/0217779 | A1 | 8/2018 | Stephens et al. |
| 2018/0217927 | A1 | 8/2018 | Stephens et al. |
| 2018/0365080 | A1 | 12/2018 | Wang et al. |
| 2020/0167512 | A1 | 5/2020 | Chitra et al. |
| 2021/0208954 | A1 | 7/2021 | Stephens et al. |

OTHER PUBLICATIONS

"International Search Report and Written Opinion Issued in PCT Application No. PCT/US20/060320", dated Feb. 23, 2021, 13 Pages.

Cohen, et al., "Efficient Memory Management for Lock-Free Data Structures with Optimistic Access", In Proceedings of the 27th ACM symposium on Parallelism in Algorithms and Architectures, Jun. 13, 2015, 10 Pages.

Gidenstam, et al., "Blocking without Locking" or LFTHREADS: A lock-free thread library, Retrieved from https://pdfs.semanticscholar.org/f3b6/cb395b63b4335592f7162bc5bc004afcb310.pdf, Oct. 2007, 36 Pages.

Martinez, et al., "Speculative Synchronization: Applying Thread-Level Speculation to Explicitly Parallel Applications", In Proceeding of ACM SIGOPS Operating Systems Review, vol. 36, Issue 5, Oct. 5, 2002, 12 Pages.

Namiot, Dmitry, "On Lock-Free Programming Patterns", In WSEAS Transactions on Computers, vol. 15, Jan. 2016, pp. 117-124.

Satran, et al., "Lockless Programming Considerations for Xbox 360 and Microsoft Windows", Retrieved From https://docs.microsoft.com/en-us/windows/win32/dxtecharts/lockless-programming#read-acquire-and-write-release-barriers, May 31, 2018, 19 Pages.

Rodriguez-Rivera, et al., "Cyclic Distributed Garbage Collection Without Global Synchronization", In Proceedings of the ACM SIGPLAN Conference on Object-Oriented Programming Systems, Languages & Applications, Oct. 1997, 18 Pages.

"Cloud Gal Episode 2: Maoni Stephens", excerpt, full video available at «https://www.youtube.com/watch?v=OwpMnxI5FLw», 1 page, May 22, 2017.

"Memory barrier", retrieved from «https://en.wikipedia.org/wiki/Memory_barrier», 4 pages, Dec. 18, 2018.

"Disruptor: High performance alternative to bounded queues for exchanging data between concurrent threads", retrieved from «https://lmax-exchange.github.io/disruptor/files/Disruptor-1.0.pdf», 11 pages, May 2011.

"Compare-and-swap", retrieved from «https://en.wikipedia.org/wiki/Compare-and-swap», 7 pages, Jul. 30, 2018.

Hao Wu, et al., "A Study of Lock-Free Based Concurrent Garbage Collectors for Multicore Platform", retrieved from «https://www.ncbi.nlm.nih.gov/pmc/articles/PMC4100292/», 17 pages, Apr. 23, 2014.

Y. Ossia, et al., "A Parallel, Incremental and Concurrent GC for Servers", retrieved from «http://www.cs.ucsb.edu/~ckrintz/racelab/gc/papers/ossia-concurrent.pdf», 2002, 12 pages.

"Which CPU architectures support Compare and Swap (CAS)?", retrieved from «https://stackoverflow.com/questions/151783/which-cpu-architectures-support-compare-and-swap-cas», Nov. 26, 2009, 26 pages.

"Fundamentals of Garbage Collection", retrieved from «https://docs.microsoft.com/en-us/dotnet/standard/garbage-collection/fundamentals», Mar. 29, 2017, 15 pages.

"Using the extra 16 bits in 64-bit pointers", retrieved from «https://stackoverflow.com/questions/16198700/using-the-extra-16-bits-in-64-bit-pointers», Sep. 20, 2018, 7pages.

"Full Garbage Collection vs. Major Garbage Collection", retrieved from «https://stackoverflow.com/questions/50081873/full-garbage-collection-vs-major-garbage-collection», Apr. 29, 2018, 5 pages.

"How to avoid garbage collection Stop the World Events in IBM Java/JVM", retrieved from «https://stackoverflow.com/questions/44550678/how-to-avoid-garbage-collection-stop-the-world-events-in-ibm-java-jvm», Jun. 14, 2017, 6 pages.

"Java very large heap sizes", retrieved from «https://stackoverflow.com/questions/214362/java-very-large-heap-sizes/9300779#9300779», Sep. 17, 2014, 30 pages.

"Memory Limits for Windows and Windows Server Releases", retrieved from «https://docs.microsoft.com/en-us/windows/desktop/Memory/memory-limits-for-windows-releases», May 30, 2018, 13 pages.

"Virtual address space", retrieved from «https://en.wikipedia.org/wiki/Virtual_address_space», Mar. 8, 2018, 3 pages.

"Atomic vs. Non-Atomic Operations", retrieved from «https://preshing.com/20130618/atomic-vs-non-atomic-operations/», Jun. 18, 2013, 13 pages.

"In MSVC, why do InterlockedOr and InterlockedAnd generate a loop instead of a simple locked instruction?", retrieved from «https://stackoverflow.com/questions/47019366/in-msvc-why-do-interlockedor-and-interlockedand-generate-a-loop-instead-of-a-si», Oct. 30, 2017, 5 pages.

"Object-oriented programming", retrieved from «https://en.wikipedia.org/wiki/Object-oriented_programming», Jan. 15, 2019, 14 pages.

"f90_gc: Fortran Garbage Collector Module", retrieved from «https://www.nag.com/nagware/np/r52_doc/f90_gc.html», no later than Jan. 19, 2019, 4 pages.

"How many CPU cycles are needed for each assembly instruction?", retrieved from «https://stackoverflow.com/questions/692718/how-many-cpu-cycles-are-needed-for-each-assembly-instruction», Jun. 14, 2015, 12 pages.

"Memory page write detection on Windows & Linux", retrieved from «https://stackoverflow.com/questions/7727461/memory-page-write-detection-on-windows-linux», Oct. 11, 2011, 6 pages.

(56) References Cited

OTHER PUBLICATIONS

"Getting to Go: The Journey of Go's Garbage Collector", retrieved from «https://blog.golang.org/ismmkeynote», Jul. 12, 2018, 47 pages.
Bruno Haible, "Weak References: Data Types and Implementation", retrieved from «https://www.haible.de/bruno/papers/cs/weak/WeakDatastructures-writeup.html», Apr. 24, 2005, 9 pages.
"jQuery.extend() | jQuery API Documentation", retrieved from «https://api.jquery.com/jquery.extend/», no later than Dec. 4, 2019, 8 pages.
"JavaScript equivalent of jQuery's extend method", retrieved from «https://stackoverflow.com/questions/11197247/javascript-equivalent-of-jquerys-extend-method», 2012, 12 pages.
"Weak references and finalizers", retrieved from «https://v8.dev/features/weak-references», Jul. 9, 2019, 11 pages.
"Top secret .NET handles—Part 1—Dependent handles", retrieved from «https://yizhang82.dev/dependent-handle», Jan. 24, 2018, 6 pages.
"Top secret .NET handles—Part 2—Ref-Counted handles", retrieved from «https://yizhang82.dev/ref-counted-handle», Feb. 12, 2018, 7 pages.
"GCHandle Struct", retrieved from «https://docs.microsoft.com/en-us/dotnet/api/system.runtime.interopservices.gchandle?view=netframework-4.8», no later than Dec. 4, 2019, 6 pages.
"ConditionalWeakTable<TKey,TValue> Class", retrieved from «https://docs.microsoft.com/en-us/dotnet/api/system.runtime.compilerservices.conditionalweaktable-2?view=netframework-4.8», no later than Dec. 4, 2019, 7 pages.
"Non Final Office Action Issued in U.S. Appl. No. 16/735,418", dated Nov. 8, 2021, 24 Pages.
Harper, et al., "Performance Impact of Lock-Free Algorithms on Multicore Communication APIs", In Repository of arXiv:1401.6100v1, Jan. 9, 2014, 16 Pages.
"Notice of Allowance Issued in U.S. Appl. No. 16/735,418", dated Mar. 30, 2022, 13 Pages.

\* cited by examiner

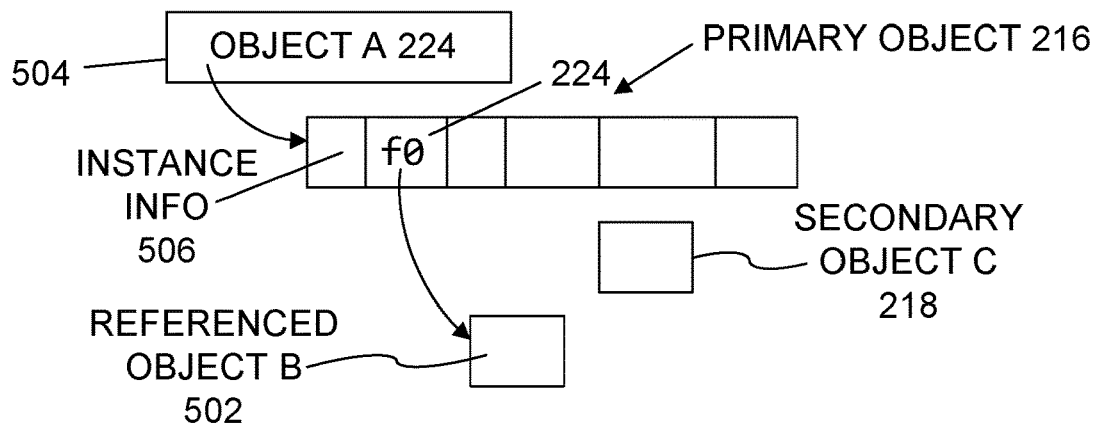
Fig. 5
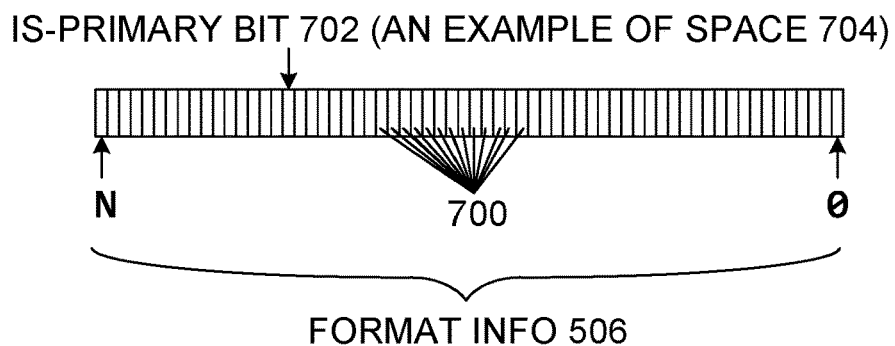
Fig. 6
Fig. 7

INTEGRATED REFERENCE AND SECONDARY MARKING

BACKGROUND

In computer programming, garbage collection (GC) helps provide automatic memory management. The "garbage" in question is memory space which has been allocated to a program for use, is no longer needed by that program, but is not yet available for use by other programs. The garbage collector tries to identify such areas of memory so they can be reclaimed for subsequent re-allocation.

Garbage collection can free programmers from the need to manually release data objects that are no longer needed, thus making programming easier. Garbage collection can also help prevent some runtime errors, thereby enhancing cybersecurity by improving the integrity and availability of data. Many programming languages or runtimes either require garbage collection, or allow garbage collection as an option. Some software development environments allow both garbage collection and manual memory management in a given program.

Efficient implementation of garbage collection can be a high priority because garbage collectors may run frequently or at unpredictable times, or both, and may significantly slow down user program execution. Indeed, most if not all garbage collectors sometimes utilize a "stop the world" approach which prevents user programs from running at the same time as the garbage collector. One could imagine configuring a garbage collector to run less frequently, or giving the garbage collector less time to complete its work. However, merely reducing the amount of time spent on garbage collection without also increasing garbage collection efficiency may well reduce the amount of memory reclaimed, which could hamper user program performance, e.g., by increasing the time spent swapping data between volatile and non-volatile memory devices, or by running out of available memory faster.

SUMMARY

Some embodiments described in this document provide improved efficiency during garbage collection, particularly with regard to secondary objects which are deemed alive (hence, not garbage) when their respective primary objects are alive even without being referenced objects of their primary objects. Some embodiments integrate aliveness marking of referenced objects with aliveness marking of secondary objects. In particular, some reduce code space and complexity, and reduce execution time, by overlapping the code paths for each kind of marking. Some embodiments improve overall memory usage efficiency by avoiding allocation of reference-sized secondary object identifier fields in objects which are not actually primary objects and thus have no secondaries. Other efficiencies may also be provided.

Some embodiments configured for memory management using secondary objects presume or provide dedicated spaces embedded in multiple objects. Each dedicated space indicates whether the space's embedding object is a primary object. Each dedicated space is smaller than an object reference; in some embodiments the dedicated space is a single bit in the object. A primary object is an object which has at least one secondary object which is deemed alive by garbage collection if the primary object is alive, without being a referenced object of the primary object. Any referenced objects of the primary will also be deemed alive. During garbage collection marking, some embodiments treat secondary objects as referenced objects at least by marking as alive both (i) all referenced objects of each alive object X and (ii) all secondary objects of each alive object X. A referenced object Y of an object X is an object that X points to in a declared embedded field of X.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 5 is a diagram illustrating a primary object, a secondary object, and object references;

FIG. 6 is a diagram illustrating a hash table which represents primary-secondary relationships between objects;

FIG. 7 is a diagram illustrating bits in an object instance data structure;

DETAILED DESCRIPTION

Overview

Figure 1:
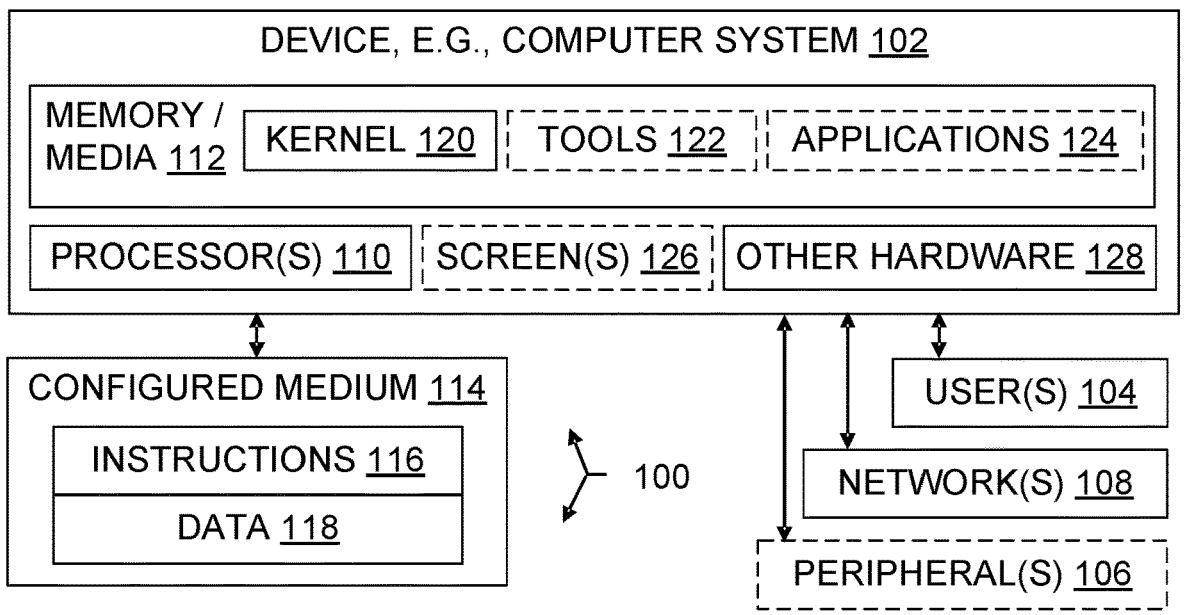
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges faced by Microsoft innovators who were working to improve the performance of concurrent or nonconcurrent garbage collection involving secondary objects. Innovators performed an investigation of the performance of concurrent garbage collection mechanisms with secondary objects. This performance investigation was a precautionary one, done as it was with a view toward making secondary object creation available directly through a public API at some later time.

In some garbage collected environments, an object may contain expanded references, e.g., by using a dependent GC handle type. A dependent handle has a primary object and a secondary object, and the secondary is only alive if the primary is alive (unless it's held live by something else).

This imposes a complexity on marking in some implementations, because the info for the primary will not know about the secondary.

Such secondary objects have been relatively rare, because they have been used only internally or in other ways largely or entirely hidden from public API access. If the usage of secondary objects increases as a result of making dependent handle creation part of a public API, then teachings provided herein will allow efficient scaling of the garbage collection of secondary objects, in ways that familiar garbage collection approaches do not provide.

In particular, one technical challenge is to how to make the collection of secondary object handles efficient and scalable. Another is how to represent primary-secondary relationships in an efficient and scalable manner. One approach would be to continue listing secondary object handles in a handle table that contains primary object handles, secondary object handles, and non-primary object handles. Non-primary objects are objects which have space to include a secondary object handle (hence being a primary of that secondary), but are not actually primary objects (i.e., they do not actually have any secondary).

But this handle table approach is inefficient because it involves looping through many non-primary objects to collect the secondary object handles during garbage collection. It also does not scale well as non-primary objects are added, because their addition increases the work done to collect secondary object handles. Storing space for secondary object handles in every object is also inefficient, because in many cases that space is never utilized.

Some embodiments taught herein build a mapping between a primary and all its secondaries, e.g., in a hash table, a balanced tree, or another data structure. Entries for non-primary objects need not appear in the mapping data structure, which helps make it more efficient than a conventional handle table so far as identifying secondary objects is concerned.

Some embodiments automatically include in garbage collection marking both the references an object contains and any secondaries it may have. Some further aid efficiency by sharing significant code paths for both kinds of marking.

In addition, some embodiments embed an IS-PRIMARY bit in objects, with the bit set to indicate that the object is a primary and hence indicate that the object has one or more secondaries, e.g., secondaries identified in the mapping discussed above. The IS-PRIMARY bit is cleared to indicate non-primary objects, namely, objects which have no secondaries. Thus, these embodiments avoid allocating an extra slot in each object as some less space-efficient approaches have done.

These are merely examples. Other aspects of these embodiments and other memory management embodiments are also described herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. In some embodiments, one or more computers are partially or fully "air gapped" by reason of being disconnected or only intermittently connected to another networked device or remote cloud. In particular, memory management functionality taught herein could be installed on an air gapped system and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in dashed outline form in the Figures, or listed inside parentheses, to emphasize that they are not necessarily part of the illustrated operating environment or all embodiments, but may interoperate with items in the operating environment or some embodiments as discussed herein. It does not follow that items not in dashed outline or parenthetical form are necessarily required, in any Figure or any embodiment. In particular, FIG. 1 is provided for convenience, inclusion of an item in FIG. 1 does not imply that the item, or the described use of the item, was known prior to the current innovations.

More About Systems

Figure 2:
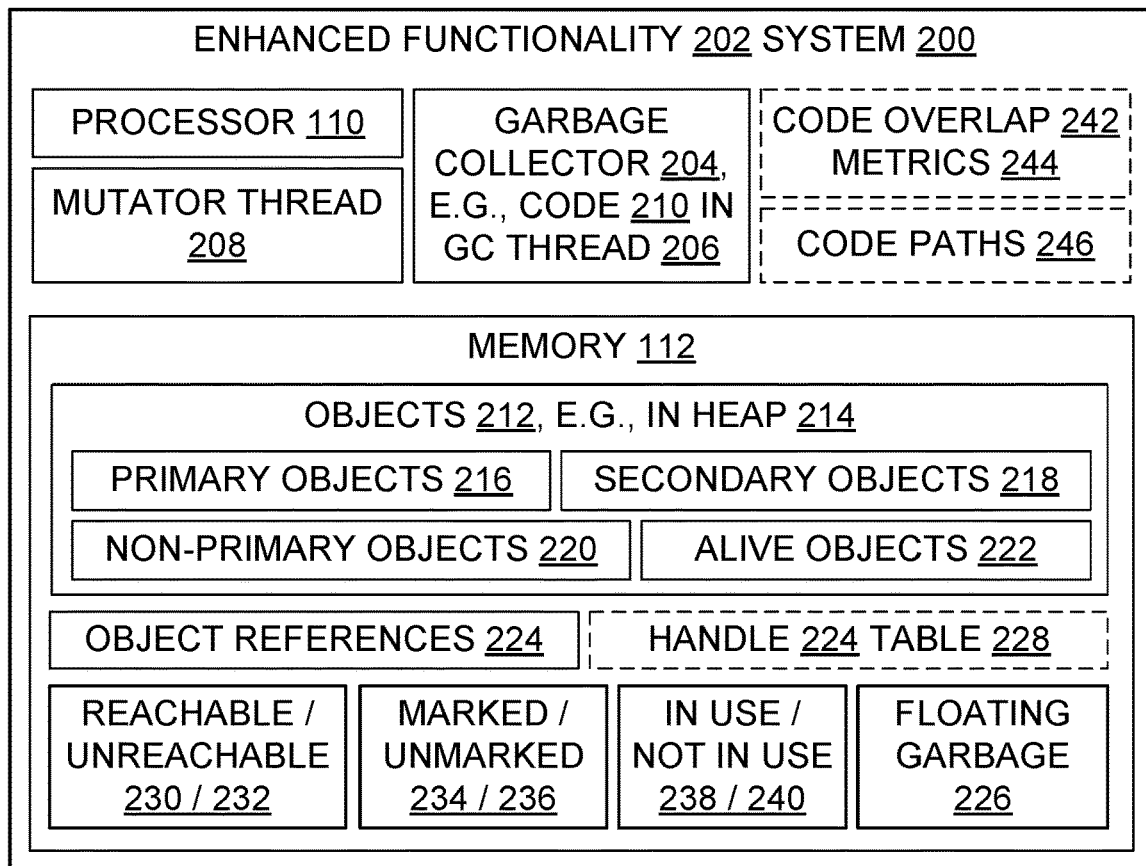
FIG. 2 is a block diagram illustrating some aspects of some computer systems that have enhanced memory management functionality.

FIG. 2 illustrates some aspects of some systems 200, which are systems 102 enhanced with at least some of the functionality 202 taught herein for memory management involving secondary objects. In particular, the illustrated enhanced system 200 includes a garbage collector (GC) 204 installed in a GC thread 206 or in GC marking phase code 210 or another location. The enhanced GC has at least one of the following characteristics: the GC integrates reference marking with secondary object marking, the GC avoids relying on reference-sized fields embedded in objects to indicate whether objects are primary objects, or the GC avoids looping though non-primary object handles to collect secondary object handles. These functionality 202 characteristics help storage efficiency 944 by reducing storage requirements for objects, and help computational efficiency 944 by reducing computational requirements and computational complexities of GC marking, both in concurrent garbage collection and in nonconcurrent garbage collection.

The mutator threads 208 may in many cases be user threads, i.e., threads running in a user address space. But the same tools and techniques taught herein can be applied to garbage collection performed on threads that run in a kernel address space.

The illustrated system 200 memory 112 includes multiple objects 212, such as objects allocated in a heap 214. As illustrated, an object 212 may be a primary object 216 which has one or more secondary objects 218, or an object may be a non-primary object 220. A secondary object Y of a primary object X may itself also be a primary object, in that Y may have its own secondary Z. Primary objects, secondary objects, and non-primary objects may each be alive 222, or not. Regardless of any primary-secondary relationship or lack thereof, primary objects, secondary objects, and non-primary objects may each have zero or more references 224 to other object(s). Handles 224 of non-primary objects (at least) may be maintained in a handle table 228. The handle table 228 may be implemented using data structure aspects such as arrays, trees, indexes, hashes, or pointers, for example.

As indicated in FIG. 2, objects 212 and other portions of memory 112 may be reachable 230 or unreachable 232 during a garbage collection marking phase, may be marked 234 or unmarked 236 by a GC marking phase, and may be in use 238 by software other than the GC, or not in use 240 by such software. Memory which is not in use but not yet identified as reclaimable may be considered floating garbage 226.

As noted, the enhanced functionality 202 may include integration of referenced object marking with secondary object marking. Such integration may be implemented by a shared code path for both kinds of marking. Accordingly, FIG. 2 also shows code paths 246, and metrics 244 for measuring the extent of any overlap 242 (sharing) of code paths. However, integration may also be evident in the lack of detail required to invoke marking. In some embodiments, the callers to a top-level GC marking routine simply ask that marking routine to get the references and mark them, without the detail of an express request for dependent handle marking. With such integration code, the callers do not need to be aware of dependent handle marking or other secondary marking, and secondary marking requires no special handling except down at the level of an individual object.

Figure 3:
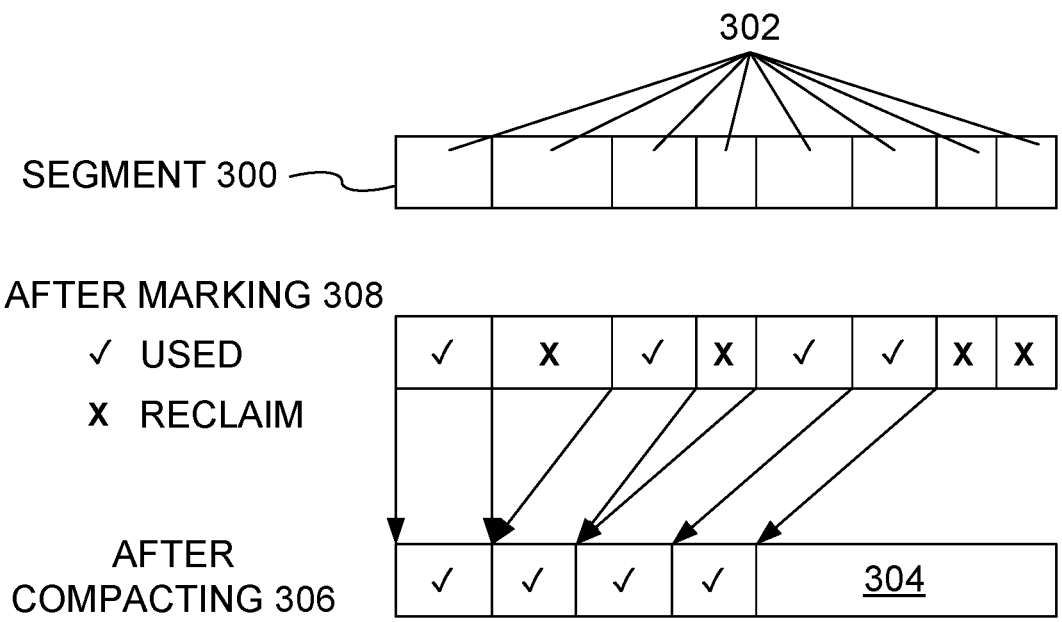
FIG. 3 is diagram illustrating aspects of memory status at different points in time during garbage collection.
Figure 4:
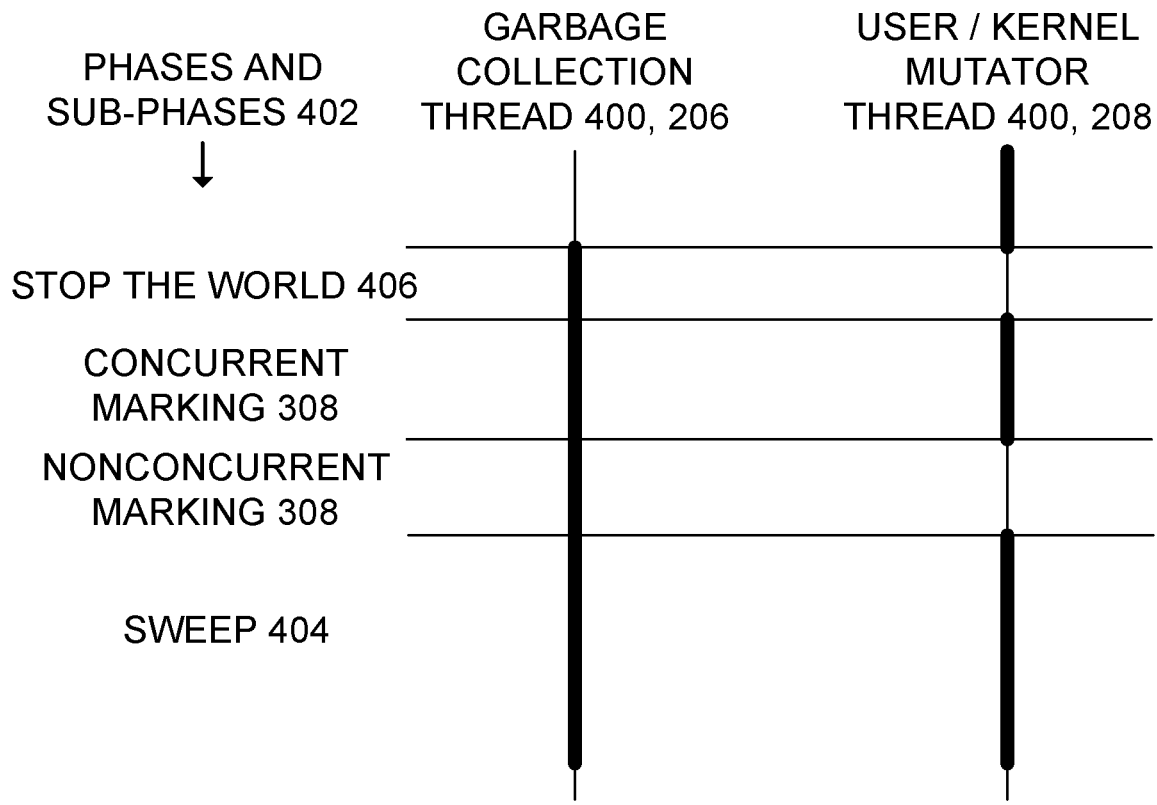
FIG. 4 is a diagram illustrating concurrent execution of a garbage collection thread and a mutator thread.

FIGS. 3 and 4 further illustrate some aspects of garbage collection. Some of these aspects are familiar, or occur in familiar garbage collection activities, but their relevance to teachings herein becomes clear only after one understands innovative garbage collection marking.

As illustrated in FIG. 3, garbage collection code operates on segments 300 of memory 112 which are divided by program execution into contiguous areas 302. A given area 302 may be clearly in use by one or more mutator threads, as indicated by the check mark symbol in FIG. 3, and hence be off-limits for reclamation. A given area 302 may also be clearly not in use, and hence reclaimable, as indicated by the X marks in FIG. 3. The reclaimability of an area 302 may also be undetermined.

Garbage collection generally involves tracing addresses or otherwise determining a memory area's in-use-or-not status, and marking 308 the memory area (or a data structure that represents the areas) accordingly. Some garbage collectors leave the marked areas in place where they are found, and then programs 120, 122, 124 are allocated memory out of the reclaimable areas. This approach is taken in so-called mark-sweep garbage collection algorithms. Other garbage collectors relocate used areas or relocate reclaimable areas, or do both, in order to compact 306 together multiple areas that have the same reclaimability status. This approach, known as a mark-compaction, often produces larger reclaimable areas 304 than the mark-sweep approach but has greater complexity due to the requirement of correctly updating addresses to match the compaction results.

FIGS. 3 and 4 help illustrate phases or sub-phases 402 of garbage collection, and their relationship to concurrency when there is some concurrency. These figures show some specific phases in a garbage collection cycle, including a marking phase 308, a sweep phase 404, and a compacting phase 306. During marking 308, reachable objects 230 or other non-reclaimable areas of memory are marked, either in place or in a data structure which represents them. During the sweep 404, reclaimable objects are cleared from the heap 214, e.g., by being placed in a pool for reallocation. During compacting 306, reclaimable areas are placed together; this may also be viewed as placing used areas together. A given garbage collector does not necessarily perform each phase, e.g., sometimes compaction 306 is omitted.

A simple approach to garbage collection is to simply suspend everything except the garbage collector while the garbage collector marks 308 memory areas as in-use or reclaimable. However, such a full-on "stop the world" approach is not acceptable in most systems because it degrades user program performance too severely. Accordingly, a garbage collector may be designed with a goal of limiting long "stop the world" sub-phases 406 by allowing concurrent execution of a garbage collection thread 206 and any mutator thread(s) 208. The marking phase may be sub-divided into a concurrent portion and a nonconcurrent portion. Usage of functionality 202 tends to increase concurrency during marking, and hence tends to improve the performance of user code that is subject to garbage collection. Although concurrency involves at least two threads overlapping in execution at least part of the time, concurrency does not require that both threads always start together or suspend together or stop together.

FIG. 5 further illustrates objects 212. In this example, an object A is a primary object 216 which has a secondary object C. Object A also references a referenced object 502 using an embedded reference 224 labeled f0. Thus, FIG. 5 shows two references 224, namely, one in a pointer variable 504 that references object A, and one in object A that references object B.

In this example, format info 506 is also embedded in object A. The format info structure 506 may indicate the types and offsets of the fields or other members of object A, for example. One of skill will recognize that although FIG. 5 has arrows pointing to one edge of a given object, which suggests the address used to identify the object is the address of the first byte of the object, in practice implementations of object-oriented programming may use addresses that identify a nonzero offset into the area 302 allocated to an object. For instance, the address may point to a byte that follows a predefined header section 506 containing format information or other metadata. Teachings herein may be adapted accordingly by one of skill.

FIG. 6 illustrates a hash table 602 which represents primary-secondary relationships. In this example, each primary-secondary relationship is part of a dependent handle 606. In this example, each dependent handle 606 has its own entry 604 in the hash table 602, and the entries are organized according to a hash code of the primary object. In the illustrated portion of a table 602, the first entry shows that an object C is a secondary of an object A, and the second entry shows that an object D is a secondary of object C. Some embodiments hash on the address of the primary object and link the handles together so that a query about a primary object can quickly provide all the secondaries of that queried primary. In a compacting garbage collector, some primary object addresses might change, after which they would be rehashed. More generally, in some embodiments handles are used to track primary-secondary object relationships, instead of using a dedicated reference-sized space in every object that could become a primary object.

FIG. 7 illustrates memory configured as a format info portion 506 of an object, including bits 700 that may be used to represent things such as the data type and the size or offset of each member of the object. Per teachings herein, a familiar instance format info may be enhanced to include an IS-PRIMARY bit 702, which indicates whether the object is a primary object. If the object is a primary, then the object's one or more secondaries are identified, e.g., in the hash table 602. The position of the IS-PRIMARY bit 702 in FIG. 7 is illustrative only, not prescriptive.

Some embodiments provide 942 the advantage that secondary objects can be used without requiring every object to set aside space big enough to hold a reference (unlike some other approaches). The embodiment sets aside one bit (the IS-PRIMARY bit) per object, plus space for actual primary and secondary object identifiers. This saves space as objects 212 proliferate. A runtime environment 100 may have a few spare bits 700 that it can use for something like this, so implementing such a bit 702 is not necessarily very disruptive to an existing runtime's codebase once the teachings herein are understood.

Another advantage of some embodiments is that marking secondary objects is integrated with marking referenced objects. This leverages existing code 210 for marking, by making it also do different work, with relatively little disruption to existing GC code.

In particular, some embodiments use or provide a secondary object memory management functionality-enhanced system, such as system 200 or another system 102 that is configured for memory management 936 using secondary objects 218 as taught herein. The enhanced system 200 includes a memory 112, and a processor 110 in operable communication with the memory. The processor 110 is configured to perform memory management steps which include (a) indicating in dedicated spaces 704 embedded in multiple objects 212 whether respective ones of the multiple objects are primary objects 216, each dedicated space being smaller than an object reference 224, a primary object being an object which has at least one secondary object 218 which is deemed alive by garbage collection if the primary object is alive, without being a referenced object of the primary object, and (b) during garbage collection marking, treating secondary objects 218 as referenced objects 502 at least by marking as alive both (i) all referenced objects of each alive object X and (ii) all secondary objects of each alive object X. The enhanced system 200 integrates marking of referenced objects with marking of secondary objects during garbage collection to recover memory for further use, without requiring objects 220 that are not primary objects to embed a reference-sized space for holding a reference to a secondary object.

Some embodiments further include a hash table 602 having entries 604. Each hash table entry includes a primary object reference 224 to a primary object 216 and a secondary object reference 224 to a secondary object 218, thereby indicating that the secondary object is a secondary object of the primary object. In other embodiments, primary-secondary relationships are represented using other data structures. Regardless of the particular data structure used, such representations can be advantageously limited to only the objects that are actually involved in primary-secondary relationships, unlike the inefficient approach of proactively allocating space in every object just in case the object operates as a primary object.

In some embodiments, each dedicated space 704 embedded in an object to indicate whether the object is a primary object consists of a single bit. One of skill understands that this bit may be labeled differently in different implementations, e.g., in an internal prototype bit 702 was referred to as a "HAR" bit ("Have Added References"), while in FIG. 7 the bit 702 is labeled as an "IS-PRIMARY" bit.

Regardless of labeling, embodiments may avoid the inefficiency of a dedicated secondary reference space in every object. This avoidance saves space even when objects that are not primary do have a reference 224 to a referenced object 502. In particular, in some embodiments the objects 212 include an object Z 220 which is not a primary object, and object Z has no secondary object and also embeds no references.

In some embodiments, a primary has multiple secondaries. Thus, in some the objects 212 include a primary object Y 216 which has at least two secondary objects 218.

In some embodiments, a secondary may itself be a primary. Thus, in some the objects 212 include a secondary object Q 218 which is also a primary object 216.

Production scenarios help illustrate the space-saving benefits of some embodiments. In some, at most ten percent of objects 212 of a program which has at least partially executed in the enhanced system 200 are primary objects 216. So at least ninety percent contribute efficiency 944 by using as little as one bit 702 to indicate they are not primaries, instead of using NULL reference-sized fields such as pointer fields. This savings may be offset some by the storage required for the hash table or other primary-secondary relationship representation data structure 602, but on balance using a bit in every object instead of a pointer in every object saves space. One of skill will understand that this ten percent max is merely an example proportion that is met in some situations, not an absolute requirement for every embodiment.

In some scenarios, a program which has at least partially executed in the enhanced system 200 has at least ten thousand objects 212, each object X of which has a respective embedded dedicated space 704 no larger than four bits to indicate whether the object X is a primary object. Each object X also lacks any embedded dedicated space larger than four bits to identify any other object as a secondary object of the object X.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, mechanisms, sequences, data structures, or functionalities for instance, and may otherwise depart from the examples provided herein.

Processes (a.k.a. Methods)

Figure 8:
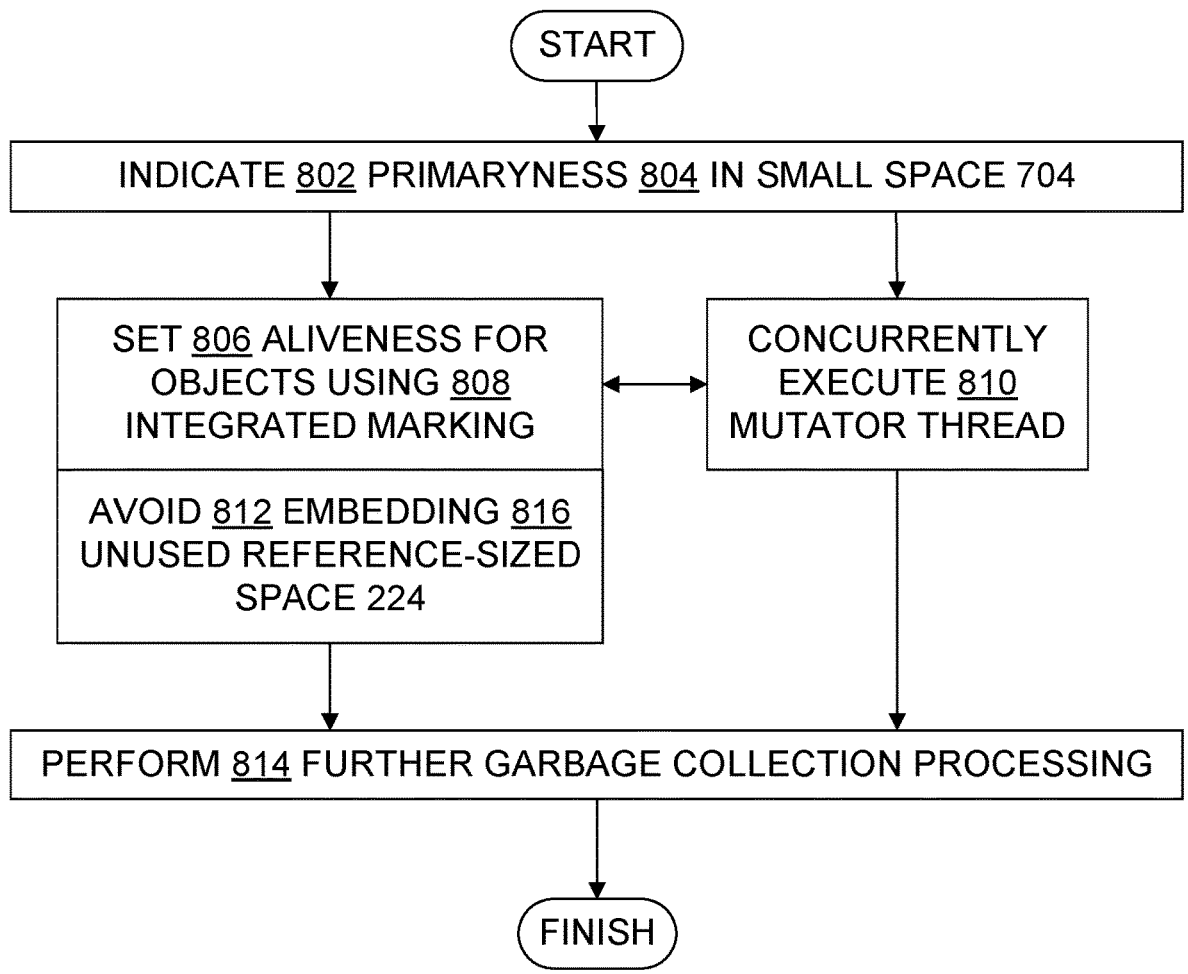
FIG. 8 is a flowchart illustrating steps in some memory management methods.
Figure 9:
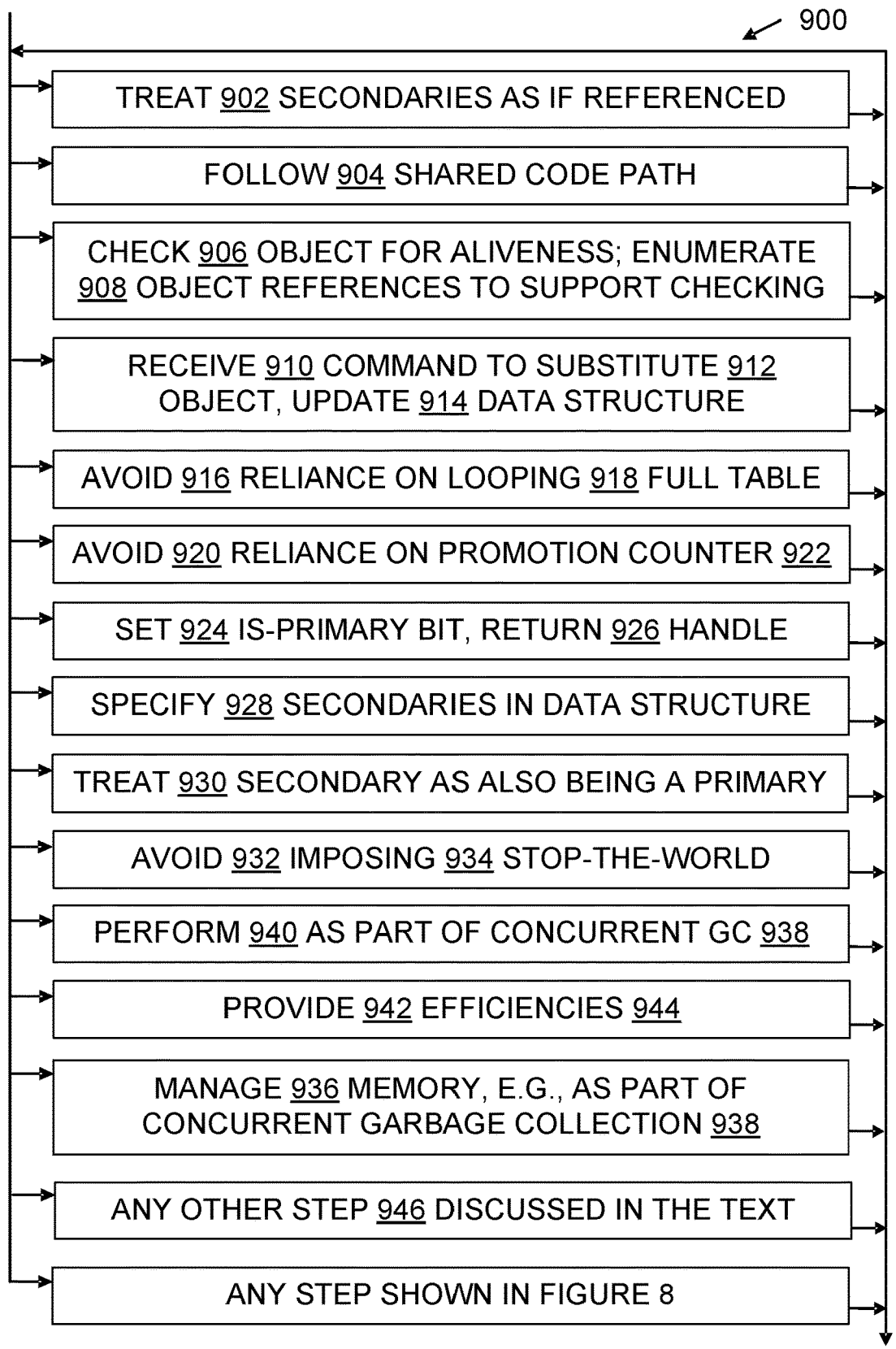
FIG. 9 is a flowchart further illustrating steps in some memory management methods.

FIG. 8 illustrates families of methods 800 that may be performed or assisted by an enhanced system, such as system 200, or another functionality-enhanced system as taught herein. FIG. 9 further illustrates memory management methods (which may also be referred to as "processes" in the legal sense of that word) that are suitable for use during operation of a system which has innovative functionality taught herein. FIG. 9 includes some refinements, supplements, or contextual actions for steps shown in FIG. 8. FIG. 9 also incorporates steps shown in FIG. 8. Technical processes shown in the Figures or otherwise disclosed will be performed automatically, e.g., by garbage collection code which reads space 704 and by object constructor code which initializes space 704, unless otherwise indicated. Processes may also be performed in part automatically and in part manually to the extent action by a human administrator or other human person is implicated, e.g., in some embodiments a developer may specify a relative frequency for garbage collection cycles. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 8 and 9. Steps may be performed serially, in a partially overlapping manner, or fully in parallel. In particular, the order in which control flowchart 800 action items or control flowchart 900 action items are traversed to indicate the steps performed during a process may vary from one performance of the process to another performance of the process. The chart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method for computing system memory management 936 using secondary objects, including the following steps performed automatically: indicating 802 in dedicated spaces 704 embedded in multiple objects whether 804 respective ones of the multiple objects are primary objects, each dedicated space being smaller than an object reference, a primary object being an object which has at least one secondary object which is deemed alive by garbage collection if the primary object is alive, without being a referenced object of the primary object; during garbage collection marking 308, treating 902 secondary objects as referenced objects at least by marking 806 as alive 222 both 808 (i) all referenced objects 502 of each alive object X and (ii) all secondary objects 218 of each alive object X; and avoiding 812 embedding 816, in objects 220 that are not primary objects, any reference-sized space for holding a reference 224 to a secondary object 218. Additional garbage collection processing, such as compacting 306 or sweeping 404, may also be performed 814.

In some embodiments, at least a portion of garbage collection marking follows 904 a code path 246 that is shared by secondary object marking and referenced object marking at least to a point where individual objects are checked for aliveness. For example, in some embodiments the same code path is followed up to a go_through_objects macro invocation or another invocation of the lowest routine (finest granularity) that marks individual objects. In these embodiments, code above this granularity does not distinguish between referenced objects and secondary objects with respect to GC marking.

As a further example, the following pseudocode illustrates use of go_through_objects:

```
if (ObjA.ContainsPointers || ObjA.IsPrimary)
{
  go_through_objects(Objects ObjA, fn mark)
  {
    while (notend( ))
    {
      Object r = GetNextReference( );
      mark(r),
      {
    }
  }
}
```

As another example, in some embodiments at least a portion of garbage collection marking follows 904 a code path 246 that is shared by secondary object marking and referenced object marking at least to a point where object references are enumerated to support checking 906 individual objects for aliveness. For example, in some embodiments the same code path is followed up to a GetNextReference( ) call or another invocation of the lowest routine (finest granularity) that obtains addresses of objects to mark.

Some embodiments provide 942 better performance by marking objects faster than earlier approaches. For example, some embodiments avoid 916 reliance on looping through a handle table that includes non-primary objects in order to collect secondary object handles. Some avoid 920 reliance on an aliveness promotion counter 922 in order to collect secondary object handles.

Some embodiments set 924 a bit 702 that is embedded in an object, in order to indicate that the object is a primary object, prior to returning 926 a handle to the object as a result of a request to create the object.

Some embodiments use 928 a hash table to specify that an object is a secondary object of a primary object. In some, a hash table or other data structure relates multiple secondary objects to a single primary object. Thus, some use 928 a data structure 602 to specify that an object X and an object Y are each a secondary object of a primary object Z. Some embodiments include an API to update the hash table or other data structure per a SetPrimary( ) or SetSecondary( ) call for example. Some methods 900 include receiving 910 a command to substitute 912 at least one object of a particular primary-object-secondary-object relationship, and updating 914 a data structure which specifies primary-object-secondary-object relationships while performing the command.

Some embodiments in some situations treat a secondary as a primary, and mark accordingly. In some methods, treating 930 a secondary object X as a primary object in its own right includes marking 308 each referenced object of object X and marking each secondary object of object X.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as IS-PRIMARY bits 702 or other spaces 704 dedicated for indicating primaryness, primary objects 216, secondary objects 218, dependent handles 606, primary-secondary relationship data structures 602, and overlapping code paths 246 which integrate referenced object marking with secondary object marking during garbage collection 938, in the form of data 118 and instructions 116, read from a removable storage medium 114 and/or another source such as a network connection, to form a configured storage medium. The configured storage medium 112 is capable of causing a computer system 102 to perform technical process steps for memory management with secondary objects, as disclosed herein. The Figures thus help illustrate configured storage media embodiments and process (a.k.a. method) embodiments, as well as system and process embodiments. In particular, any of the process steps illustrated in FIG. 8 or 9, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a method for memory management using secondary objects. This method includes: indicating 802 in dedicated primaryness spaces 704 embedded in multiple objects whether respective ones of the multiple objects are primary objects 216, each dedicated space 704 being smaller than an object reference 224, a primary object being an object which has at least one secondary object 218 which is deemed alive by garbage collection if the primary object is alive, without being a referenced object of the primary object; during garbage collection marking 308, treating 902 secondary objects as referenced objects at least by marking as alive both (i) all referenced objects 502 of each alive object X and (ii) all secondary objects 218 of each alive object X; and avoiding 812 embedding 816, in objects that are not primary objects, any reference-sized space for holding a reference to a secondary object, each reference-sized space being at least thirty-two bits in size.

In some embodiments, integration of secondary object marking with referenced object marking contributes to code-leveraging and performance speed benefits of the embodiment. In some, this integration includes overlapping 242 code paths. Code paths overlap to the extent they follow the same execution path.

Overlap 242 may be measured in various ways. For example, one could measure overlap at the level of stacks. Assume individual letters represent respective methods or other routines invoked along an execution path. Then the path ABCDEFGKLM and the path ZYABCDEFGR have an overlap of ABCDEFG. If ABCDEFGKLM is the referenced object marking path and ZYABCDEFGR is the secondary object marking path then the overlap of ABCDEFG is 70% of the referenced object marking path. Alternatively, one could measure overlap 242 in terms of shared code blocks, or shared lines of code, or shared instructions. Unless otherwise stated, any of these measures 244 can be used, and the overlap percentage is whichever percentage is greatest. More generally, when an enhanced GC marks 308, there is a common code path that performs the "getting the references and marking them" work. Because the dependent handle marking is integrated in this common code, callers above the level of individual object marking do not need to be aware of the distinction between referenced object marking and secondary object marking, and require no special handling when implementing functionality 202 into a previously non-enhanced system 102.

In particular, in some embodiments the method includes following 904 a referenced object marking code path 246-RO to mark referenced objects during a garbage collection, and includes following 904 a secondary object marking code path 246-SO to mark secondary objects during the garbage collection. In some of these, at least fifty percent of the referenced object marking code path overlaps 242 the secondary object marking code path. Overlap 242 is measured under at least one of the following overlap metrics 244, whether inclusive of library code or exclusive of library code or both, and whether along all executed paths or all possible paths or only shortest paths: number of lines of code, number of compiler-generated instructions, number of routines called, or number of stack frames.

In some embodiments, integrated reference and secondary marking provide increased flexibility because dependent handle marking can be performed earlier, instead of being the last sub-phase of marking 308. Without such flexibility, dependent handle marking might need to be the last sub-phase in order to have complete results from all sub-phases that could make objects alive, and hence be able to mark the secondaries of all alive primaries. But this inflexibility conflicts with making other sub-phases the last sub-phase of marking 308, potentially leading to multiple instances of purported "last" sub-phases to clean up after each other.

In some embodiments, the enhanced marking method for secondary object marking integrated with referenced object marking avoids 932 imposing 934 a stop-the-world condition 406, by performing garbage collection marking of secondary objects concurrently 810 with execution of an application program. Indeed, in some embodiments the method is implemented as part of a background garbage collector. Hence, the method is performed 940 as part of a concurrent garbage collection. In other embodiments, the method is performed as part of nonconcurrent garbage collection. In either situation, the method may enhance performance by reducing the length of one or more STW sub-phases.

In some embodiments, performance speed in enhanced relative to some prior approaches because the embodiment avoids 916 reliance on looping 918 through any handle data structure that includes handles of both primary objects 216 and non-primary objects 220 in order to collect secondary object 218 handles for marking 308.

Additional Details, Examples, and Observations

Additional support for the discussion above is provided below. For convenience, this additional support material appears under various headings. Nonetheless, it is all intended to be understood as an integrated and integral part of the present disclosure's discussion of the contemplated embodiments.

Concurrent Dependent Handle and Finalization Scanning

Background garbage collection (BGC), which is a concurrent flavor of GC, is optimized for latency, in part by shortening the STW part. One flow of a non-enhanced BGC includes an Init initialization phase (which is done in STW), followed by a concurrent marking phase (not STW), followed by a Final Mark final marking phase (STW), followed by a sweep phase. The final marking phase in this BGC includes catch up, dependent handle marking, short weak NULLING, finalization scanning, and long weak NULLING sub-phases.

In this BGC example, the bulk of the mark work is done concurrently with the user threads; sweep is all done concurrently. Init and Final Mark are done STW and usually are very short. Init determines that a BGC cycle should be performed and walks the call stacks to populate the stack roots (no marking is done at this point). Final Mark begins by getting an accurate picture of the memory management status by doing a catch up. The catch up includes getting the current roots and marking them again; since most of the objects were already marked this part of marking typically will finish very quickly. The catch up also includes revisiting the modified portion of the heap. Since most objects are already marked there will often not be much to do here (this example revisits concurrently during Concurrent Mark so the revisit during STW also is usually very fast).

At this point the BGC knows which objects should be alive, except with regard to any of the following categories of constructs.

Finalizable object: The BGC should go through finalizable objects and promote the ones GC found to be dead and the objects they hold onto. This is called finalization scanning. Finalization may be used to help manage the lifetime of managed objects, e.g., by adding an object back to a pool when a GC indicates the object died (the finalizer is run). The time it takes to promote finalizable objects that were found to be dead (in order to run their finalizers) and their children can be significant.

Dependent handles: The BGC should go through the primary targets of dependent handles (DHs) and for the live primary objects promote their secondary object (treat them as alive). If any secondary causes any DH's primary to be live the BGC should do the same thing for that DH. This is called DH scanning. DHs used to be rare, as they were used in the Core Language Runtime only for Edit and Continue. Then some runtime usage of DHs was added, e.g., use of dependent handles to interact with xaml. Then the Core Language Runtime exposed ConditionalWeakTable. At this point, the usage of DHs by some code is not rare, so the time it takes to promote objects due to DHs can also be long when using non-enhanced code.

NULLing: NULL the short weak or long weak handles' targets if they are found to be dead. Note that in this example DHs use long weak semantics so they will be NULLed with the long weak handles (e.g., in one implementation both are done in GCScan::GcWeakPtrScan). Short/long weak handle target NULLing can take a while if there are many handles, but NULLing itself is quick so generally this is not expected to be a substantial performance problem.

These categories of constructs are generally optional in applications 124. But if they are present, this example BGC processes them during the Final Mark phase which is done STW. As heap sizes are getting bigger, the chance of the Final Mark taking longer is increasing if code uses any or all of these categories of constructs. Teachings herein can be applied to reduce latency by making more of garbage collection concurrent, e.g., by reducing or eliminating STW sub-phases.

Some legacy code does not expose the dependent handle type publicly to the user code, and the user code can only create dependent handles indirectly by using a BCL API. BCL (Base Class Library) is the lowest managed code layer, built right on top of a runtime. The implementation of this BCL API can allocate or free dependent handles. To the runtime, the BCL is user code, but is not end user code because the BCL can communicate with the runtime in ways that end user code can't, for example, to create dependent handles. At some point dependent handles may be exposed publicly to end user code. To the extent such exposure increases use of dependent handles, functionalities 202 taught herein may provide 942 performance benefits.

In considering how to enhance a legacy BGC with improved functionality 202, one goal is scalability. In some scenarios, there could be an arbitrary number of objects ready for finalization or an arbitrary number of dependent handles. Performance improvements may be more desirable if they are able to run concurrently or mostly concurrently with application code.

In some scenarios, another consideration is how to preserve current program semantics. Some environments include a pattern where user code uses both a short and a long weak handle to point to the same object, and code assumes that if the short weak handle's target is null and the long weak handle's target is not null, the finalizer will be run. Some embodiments preserve this behavior when making things more concurrent. In some, the long weak semantics of DHs is preserved.

In some scenarios, another consideration is how to make DH scanning faster. In some legacy code, DH scanning is done as a separate step, because DH was viewed as an add-on. The non-enhanced DH scanning uses a naïve algorithm that is not very performant. The non-enhanced DH scanning also is not elegantly integrated with the rest of BGC, in that non-enhanced DH scanning tries to be the last step during marking. This is awkward because DH scanning itself could introduce other work like mark overflow, leading one perhaps to interleave processing mark overflow and scanning DHs. If there is also another type of root, one may try to interleave it as well, making code flow and design even messier.

Teachings herein address both defects of non-enhanced DH scanning. They describe an enhanced way of handling DH scanning and making it more concurrent. With the following observations in mind, one of skill can see how to fold enhanced DH scanning into the existing marking code.

First, a DH or other primary-secondary relationship indicates that if the primary object is considered live, its secondary object should be considered live. This lifetime consideration is the same as with any references the primary object contains; if an object is marked (considered alive) then all the references it contains should be marked. And if this object is a primary object of a DH or multiple DHs, its corresponding secondary object or objects should be marked as well.

Second, when a GC marks an object, it gets the references the object contains and marks those. In some legacy code this is done in a routine called go_through_objects, which decodes the info that tells the GC where to find the references this object contains. If enhanced code sees this object has corresponding secondaries, it could integrate these as references for marking purposes as well, so that go_through_objects or similar object relationship tracing routines in other implementations will mark them as well. The secondaries do not become referenced object for purposes other than marking, e.g., a debugger could not trace from a primary to a secondary by simply following an address embedded in the primary.

Some embodiments include IRM functionality 202, where IRM is an acronym for Integrated Reference Marking. Since the IRM functionality 202 integrates referenced object marking and secondary object marking, it may also be referred to as "integrated reference and secondary marking". Per the IRM functionality 202, marking 308 is aware of the integrated references added by the DHs. Code paths that call go_through_objects or the like can remain unchanged when IRM functionality 202 is added, because IRM will automatically include all references (traditional or to secondary objects) that each object contains. This is a much more elegant solution than the previous separate DH scanning, and it is easier to make the DH scanning concurrent by leveraging pre-existing referenced object scanning's concurrent marking.

One aspect of IRM functionality 202 is a performant way to recognize which secondaries correspond to a primary object. Enhanced code should recognize when to check an object for secondaries. This is accomplished by using and checking the IS-PRIMARY bit. The bit is set to indicate that one or more secondaries are present; a given primary object can have multiple secondaries. In one implementation, the IS-PRIMARY bit is embedded in a syncblock on a 64-bit system. This does not rule out implementations for 32-bit address spaces, but the relative performance gain may be significantly greater on 64-bit systems because they can have much larger heaps than 32-bit systems.

Enhanced code with IRM functionality 202 should also be capable of getting the secondaries for an object with the IS-PRIMARY bit set. Some embodiments include a hash table 602 for objects that are primaries for DHs. To avoid problems from unstable hashes, some embodiments use a hash code for the primary object as the hash table key. This table 602 should be built with DH operations, e.g., when the primary is set for a DH, it should be inserted into the primary hash table with its secondary as its value (or as one of the values if there are multiple secondaries with this primary). If the primary of a DH is changed, the old primary would be removed from the hash table and the new one would be inserted. In order to avoid very fine synchronization when a BGC is also looking at this hash table, some embodiments may have the BGC take a lock (STW) and work for a little while before releasing the lock.

In this manner DH scanning may be folded into the normal marking. However, one additional consideration in some scenarios is how to record modifications in the DHs so they will be tracked by revisit code. In legacy code, heap modification is sometimes tracked via a write barrier which records the modification in a write watch table. In order to achieve a similar effect for DH marking, some embodiments record modifications of primaries of the DHs, so marking code will revisit those modified secondaries. For the handle table, code may already call a handle table write barrier (e.g., HndWriteBarrier or a similar barrier in other environments) to adjust the age. Enhanced code may take this opportunity to also record the primary object in the write watch table, using the write barrier code.

As an aside, some embodiments omit a separate DH scanning in the Final Mark. If there is any modification to a primary's secondaries it would be reflected via the handle table write barrier so the primary will be revisited naturally. If a new primary is added (by modifying the primary of a DH or allocating a new DH), its secondaries would have been built up before garbage collection suspended the execution engine. At STW, the garbage collector has access to the relationships of the secondaries to primaries, so if a primary object is marked the garbage collector can determine which secondaries should also be marked.

One flow of an enhanced BGC includes the Init initialization phase (STW), followed by a concurrent marking phase with integrated marking (not STW), followed by a Final Mark final marking phase with integrated marking which also does catch up and short weak NULLING (STW), followed by a concurrent finalization scanning phase with integrated marking (not STW), followed by long weak NULLING (STW), followed by the sweep phase. This enhanced BGC workflow will tend to have shorter STW time than the workflow of the non-enhanced BGC described above, thereby improving application performance.

Technical Character

The technical character of embodiments described herein will be apparent to one of ordinary skill in the art, and will also be apparent in several ways to a wide range of attentive readers. Some embodiments address technical activities such as setting or clearing bits, following pointers, allocating memory, creating or updating hash tables, and managing memory in a computer system, which are each an activity deeply rooted in computing technology. Some of the technical mechanisms discussed include, e.g., embedded bits, typo info structures, objects, object references, hash tables, handles, and code examples. Some of the technical effects discussed include, e.g., decreased storage requirements for non-primary objects, integration of referenced object marking with secondary object marking during garbage collection, increased concurrency, decreased STW times, and avoidance of particular inefficiencies during garbage collection. Thus, purely mental processes are clearly excluded. Other advantages based on the technical characteristics of the teachings will also be apparent to one of skill from the description provided.

Some embodiments described herein may be viewed by some people in a broader context. For instance, concepts such as whether something is in use, size, collection, management, and relationships may be deemed relevant to a particular embodiment. However, it does not follow from the availability of a broad context that exclusive rights are being sought herein for abstract ideas, they are not. Rather, the present disclosure is focused on providing appropriately specific embodiments whose technical effects fully or partially solve particular technical problems, such as how to increase garbage collection concurrency with application software. Other configured storage media, systems, and processes involving usage status, size, collection, management, or relationships are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, programming languages or libraries or runtimes, software processes, development tools, identifiers, data structures, data organizations, notations, control flows, pseudocode, naming conventions, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
IaaS or IAAS: infrastructure-as-a-service
IoT: Internet of Things
LAN: local area network
OS: operating system
PaaS or PAAS: platform-as-a-service
RAM: random access memory
ROM: read only memory
TPU: tensor processing unit
UEFI: Unified Extensible Firmware Interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

As to "referenced objects" versus "secondary objects" one of skill will acknowledge that regular references to objects may be explicitly declared in source code, e.g., as pointer fields, and that dependent handles may also be explicitly declared in source code. However, these identifications of somehow-related objects differ in their usages and in their storage requirements in some embodiments. A regular reference in an object A referring to another object involves allocating a reference-sized field in A, which does not necessarily ever identify some other object B. Code always incurs the storage cost of that field in A even when A never refers to some other object B. By contrast, a dependent handle establishes a relationship between an object A and another object B (namely, if A is alive then consider B alive). The dependent handle for object A only uses a reference-sized field to identify B when there is an actual relationship between a particular object A and a particular object B.

The terms "reference", "address", "pointer", and "handle" are used herein when discussing an object identification that is at least reference-sized in storage, e.g., they are at least N bits in an N-bit virtual address space. More to the point, each is bigger than the IS-PRIMARY bit.

As used herein with regard to objects, "contain" is used more broadly than "embed". "Contain" covers inclusion through references, dependent handles, or contiguous allocation, whereas "embed" requires contiguous allocation. Thus, if an object A has a pointer to an object B, then A contains B and the pointer is embedded in A but B itself is not embedded in A. This distinction respects the difference between (a) supporting dependent objects by embedding a reference-sized field in every object in case they are used as primary objects, and (b) supporting dependent objects by embedding only a single bit (IS-PRIMARY bit) and using reference-sized fields (in the hash table) only for the objects that are actually primary objects.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Memory management operations such as marking objects, identifying referenced objects, identifying secondary objects, and many other operations discussed herein, are understood to be inherently digital. A human mind cannot interface directly with a CPU or other processor, or with RAM or other digital storage, to read and write the necessary data to perform the memory management steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as allocating, checking, clearing, embedding, enumerating, executing, following, indicating, looping, managing, marking, measuring, performing, providing, setting, specifying, substituting, treating, updating, or using (and allocates, allocated, checks, checked, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users, e.g., software developers
106 peripherals
108 network generally, including, e.g., LANs, WANs, software defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, and so on 124 applications, e.g., word processors, web browsers, spreadsheets, games, email tools, commands
126 display screens, also referred to as "displays"
128 computing hardware not otherwise associated with a reference number 106, 108, 110, 112, 114
200 system enhanced by garbage collection memory management functionality, including some or all of the functionalities 202
202 garbage collection memory management functionality in any form described herein
204 garbage collector, also referred to as "GC" or as "garbage collector code"
206 GC thread, namely, a thread which is at least primarily (over 50% of instructions) dedicated to garbage collector code
208 mutator thread, namely, a thread which is at least primarily (over 50% of instructions) dedicated to code other than garbage collector code; a mutator thread is often a user thread but may also be a kernel thread; "mutator" in the term indicates that the mutator thread may mutate (i.e., change) addresses which are used during garbage collection
210 garbage collector marking phase code
212 object, e.g., object data structure allocated in a program that implements an object-oriented programming paradigm; may be implemented using, e.g., classes, structs, unions, members, fields, constructors, destructors
214 heap portion of memory, often referred to simply as the "heap"
216 primary object, namely, an object that has at least one secondary object
218 secondary object, namely, an object which should be marked alive if its primary object is alive; secondary objects are identified by mechanisms other than having their address embedded in a reference field in their primary object, e.g., secondary object can be identified in a hash table of primary-secondary relationships
220 non-primary objects, i.e., an object which has no secondary object and which may or may not have any referenced objects
222 alive object, namely, an object marked as alive (still in use) by the garbage collector
224 object reference, namely, a value embedded in an object that identifies another object; references may also be referred to as "pointers" or "object addresses" or "links" or "handles"; 224 also refers to a reference field; a reference field normally has at least as many bits as an address in whichever address space contains the referenced object, e.g., at least 32 bits in a 32-bit address space and at least 64 bits in a 64-bit address space, although the actual reference itself may be somewhat smaller, e.g., 16 bits or 24 bits or 48 bits
226 floating garbage, e.g., memory that is not in use but not yet marked for reclaiming
228 handle table
230 reachable memory, that is, memory reachable through heap roots or other data structures that connect allocated memory portions
232 unreachable memory, namely, memory that is not reachable
234 marked memory
236 unmarked memory
238 in use memory
240 not in use memory
242 code path overlap during execution; may be measured using one or more overlap metrics 244; numeral 242 also refers to the action of overlapping two or more code paths, e.g., through program design and construction that creates an execution overlap
244 code overlap metric, e.g., the extent to which two (or more) code paths overlap in terms of their respective number of lines of code, number of compiler-generated instructions, number of routines called, or number of stack frames
246 path taken through code during execution; in particular, 246-RO denotes a referenced object marking code path and 246-SO denotes a secondary object marking code path
300 segment of memory, e.g., a region, page, block, or other area of memory which is managed at least in part by garbage collection
302 contiguous area of memory which has been allocated, and which is either in use or not known to be reclaimable (indicated in FIG. 3 by ✓) or else is known to be reclaimable because it is known to be no longer in use by the program that allocated it (indicated in FIG. 3 by X)
304 contiguous area of reclaimable memory resulting from compaction
306 compaction, e.g., relocation of one or more reclaimable areas to create a larger contiguous reclaimable area
308 marking; actions performed during garbage collection to mark memory areas as (i) in use or not known to be reclaimable, or (ii) known to be reclaimable
400 thread generally
402 phases and sub-phases of garbage collection
404 sweep phase of garbage collection
406 stop-the-world sub-phase of garbage collection; also referred to as "STW"
502 referenced object
504 variable declared or used to hold a pointer to an object
506 format info embedded in storage space dedicated to an object
602 hash table or other data structure representing primary-secondary relationships; 602 also refers to a primary-secondary relationship
604 entry in data structure 602
606 dependent handle, namely, a handle which identifies a primary-secondary relationship between objects; a dependent handle has a primary object and a secondary object associated with it, and associating two objects this way with a dependent handle forms a garbage collection relationship between the objects: if the primary object is alive then the secondary object will also be considered alive.
700 bit (i.e., memory location whose capacity is one binary digit)
702 IS-PRIMARY bit, namely, a bit whose value indicates whether or not an object in which the bit is embedded is a primary object
704 space inside an object which is dedicated for secondary object memory management; space 704 may include one or more bits and in particular may include or consist of (depending on the implementation) IS-PRIMARY bit 702; may include other bits, e.g., to indicate a minimum generation of added references
800 flowchart; 800 also refers to memory management methods illustrated by or consistent with the FIG. 8 flowchart
802 indicate whether an object is a primary object, e.g., by setting or clearing IS-PRIMARY 702
804 primaryness, e.g., whether an object is a primary object 806 set object aliveness
808 use integrated reference and secondary marking; 808 also refers to integration of these kinds of marking
810 execute concurrently
812 avoid embedding a reference-sized space in every object merely in case it happens to be a primary object
814 garbage collection processing generally
816 embed a bit variable or other data structure in an object
900 flowchart, 900 also refers to memory management methods illustrated by or consistent with the FIG. 9 flowchart (which incorporates the steps of FIG. 8)
902 treat secondary objects as referenced object for the purpose of marking 308
904 follow a code path
906 check an object for aliveness
908 enumerate object references or addresses or handles
910 receive a command
912 substitute one object for another object
914 update a data structure
916 avoid reliance on looping through a full table, that is, through a table containing both primary and non-primary objects when enumerating 908 objects for marking
918 loop through a full table (one containing both primary and non-primary objects)
920 avoid reliance on a promotion counter when enumerating 908 objects for marking
922 promotion counter, e.g., a counter of how many secondary objects remain to be marked alive, or how many secondary objects remain to be visited during marking
924 set an IS-PRIMARY bit to indicate an object is a primary object
926 return an object handle, e.g., as a return value of an object constructor
928 specify a secondary object, e.g., in a data structure 602 that represents primary-secondary relationships
930 treat a secondary object as a primary object in its own right
932 avoid imposing a stop-the-world condition
934 impose a stop-the-world condition
936 manage memory in a computing system
938 perform garbage collection as part of memory management
940 perform (execute) as part of a concurrent garbage collection
942 provide at least one efficiency 944
944 efficiency, e.g., faster marking, lower storage requirement for objects, simpler code design
946 any step discussed in the present disclosure that has not been assigned some other reference numeral

CONCLUSION

In short, the teachings herein provide a variety of computing system 102 memory management functionalities 202 which enhance the performance of applications 124 that use managed memory 112. Managing 936 secondary objects 218 efficiently increases garbage collection concurrency 810 and reduces object 212 storage requirements. Aliveness marking 308 of secondary objects 218 is integrated 808 with aliveness marking 308 of referenced objects 502. Allocation of reference-sized secondary object identifier fields (224 in FIG. 5) in objects 220 which are not primary objects is avoided 812; a dedicated bit 702 specifies primary objects 216. A primary object 216 is an object 212 with at least one secondary object 218; the secondary object 218 is deemed alive 806 by garbage collection 938 if the primary object 216 is alive. A secondary object 218 of a primary object X is normally not also a referenced object 502 of the same primary object X. Any referenced objects 502 of the alive primary object 216 will also still be deemed alive 806. Code paths 246-RO for marking 308 referenced objects 502 can be shared with code paths 246-SO for marking 308 secondary objects 218 to allow more efficient 944 secondary object marking 308. Primary-secondary object relationships 602 may be represented in dependent handles 606, and may be specified 928 in a hash table 602 or other data structure.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware into software. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers or other development environment providers or other runtime providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 8 and 9 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, sample fields, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments, one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only, information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A system configured for memory management using secondary objects, the system comprising:
    a memory;
    a processor in operable communication with the memory, the processor configured to perform steps for memory management which include (a) indicating in dedicated spaces embedded in multiple objects whether respective ones of the multiple objects are primary objects, each dedicated space being smaller than an object reference, a primary object being an object which has at least one secondary object which is deemed alive by garbage collection if the primary object is alive, without being a referenced object of the primary object, and (b) during garbage collection marking, treating secondary objects as referenced objects at least by marking as alive both (i) all referenced objects of each alive object X and (ii) all secondary objects of each alive object X;
    whereby the system integrates marking of referenced objects with marking of secondary objects during garbage collection to recover memory for further use, without requiring objects that are not primary objects to embed a reference-sized space for holding a reference to a secondary object.

2. The system of claim 1, further comprising a hash table having entries, wherein a hash table entry includes a primary object reference to a primary object and a secondary object reference to a secondary object, thereby indicating that the secondary object is a secondary object of the primary object.

3. The system of claim 1, wherein each dedicated space embedded in an object to indicate whether the object is a primary object consists of a single bit.

4. The system of claim 1, wherein the objects include a primary object Y which has at least two secondary objects.

5. The system of claim 1, wherein the objects include an object Z which is not a primary object, and wherein object Z has no secondary object and embeds no references.

6. The system of claim 1, wherein the objects include a secondary object Q which is also a primary object.

7. The system of claim 1, further characterized in at least one of the following ways:
- at most ten percent of objects of a program which has at least partially executed in the system are primary objects; or
- a program which has at least partially executed in the system has at least ten thousand objects, each object X of which has a respective embedded dedicated space no larger than four bits to indicate whether the object X is a primary object and each object X of which lacks any embedded dedicated space larger than four bits to identify any other object as a secondary object of the object X.

8. A method for memory management using secondary objects, the method comprising automatically:
- indicating in dedicated spaces embedded in multiple objects whether respective ones of the multiple objects are primary objects, each dedicated space being smaller than an object reference, a primary object being an object which has at least one secondary object which is deemed alive by garbage collection if the primary object is alive, without being a referenced object of the primary object;
- during garbage collection marking, treating secondary objects as referenced objects at least by marking as alive both (i) all referenced objects of each alive object X and (ii) all secondary objects of each alive object X; and
- avoiding embedding, in objects that are not primary objects, any reference-sized space for holding a reference to a secondary object.

9. The method of claim 8, further comprising at least one of the following during garbage collection marking:
- following a code path that is shared by secondary object marking and referenced object marking at least to a point where individual objects are checked for aliveness; or
- following a code path that is shared by secondary object marking and referenced object marking at least to a point where object references are enumerated to support checking individual objects for aliveness.

10. The method of claim 8, further comprising at least one of the following during garbage collection marking:
- avoiding reliance on looping through a handle table that includes non-primary objects in order to collect secondary object handles; or
- avoiding reliance on an aliveness promotion counter value in order to collect secondary object handles.

11. The method of claim 8, further comprising setting a bit that is embedded in an object, in order to indicate that the object is a primary object, prior to returning a handle to the object as a result of a request to create the object.

12. The method of claim 8, further comprising using a hash table to specify that an object is a secondary object of a primary object.

13. The method of claim 8, further comprising using a data structure to specify that an object X and an object Y are each a secondary object of a primary object Z.

14. The method of claim 8, further comprising receiving a command to substitute at least one object of a particular primary-object-secondary-object relationship, and updating a data structure which specifies primary-object-secondary-object relationships while performing the command.

15. The method of claim 8, further comprising treating a secondary object X as a primary object in its own right, by marking each referenced object of object X and marking each secondary object of object X.

16. A computer-readable storage medium configured with data and instructions which upon execution by a processor cause a computing system to perform a method for memory management using secondary objects, the method comprising:
- indicating in dedicated spaces embedded in multiple objects whether respective ones of the multiple objects are primary objects, each dedicated space being smaller than an object reference, a primary object being an object which has at least one secondary object which is deemed alive by garbage collection if the primary object is alive, without being a referenced object of the primary object;
- during garbage collection marking, treating secondary objects as referenced objects at least by marking as alive both (i) all referenced objects of each alive object X and (ii) all secondary objects of each alive object X; and
- avoiding embedding, in objects that are not primary objects, any reference-sized space for holding a reference to a secondary object, each reference-sized space being at least thirty-two bits in size.

17. The computer-readable storage medium of claim 16, wherein the method comprises following a referenced object marking code path to mark referenced objects during a garbage collection, and comprises following a secondary object marking code path to mark secondary objects during the garbage collection, and wherein at least fifty percent of the referenced object marking code path overlaps the secondary object marking code path under at least one of the following overlap metrics, whether inclusive of library code or exclusive of library code or both, and whether along all executed paths or all possible paths or only shortest paths: number of lines of code, number of compiler-generated instructions, number of routines called, or number of stack frames.

18. The computer-readable storage medium of claim 16, wherein the method avoids imposing a stop-the-world condition, by performing garbage collection marking of secondary objects concurrently with execution of an application program.

19. The computer-readable storage medium of claim 16, wherein the method is performed as part of a concurrent garbage collection.

20. The computer-readable storage medium of claim 16, wherein the method avoids reliance on looping through any handle data structure that includes handles of both primary objects and non-primary objects in order to collect secondary object handles for marking.

* * * * *